W. AUTENRIETH.
Club-Foot Shoe.

No. 167,867. Patented Sept. 21, 1875.

Attest.

Inventor.

UNITED STATES PATENT OFFICE.

WILLIAM AUTENRIETH, OF CINCINNATI, OHIO.

IMPROVEMENT IN CLUB-FOOT SHOES.

Specification forming part of Letters Patent No. 167,867, dated September 21, 1875; application filed August 14, 1875.

CASE B.

*To all whom it may concern:*

Be it known that I, WILLIAM AUTENRIETH, of Cincinnati, in the county of Hamilton and State of Ohio, have invented certain Improvements on Club-Foot Shoes, of which the following is a specification:

My invention relates to shoes for bringing club and twisted feet into their proper position, and is an improvement on the invention patented to me October 27, 1874; and consists in projecting the sole-piece back, and connecting it with the screw by a sliding nut instead of by the sector described in that patent.

The combination of sector and screw, as shown in my former patent, is defective in this, that it requires greater power on the screw, and becomes quickly worn, so that it slips upon the screw, or the screw itself turns back with the motion of walking, thus loosening the tension on the foot. All this is overcome by my improvement, making a slot at the end of the shank, and attaching therein a swiveled nut, which, bearing on the screw on every side, wears away slowly, if at all, and remains in any position where it is fixed.

Figure 1:
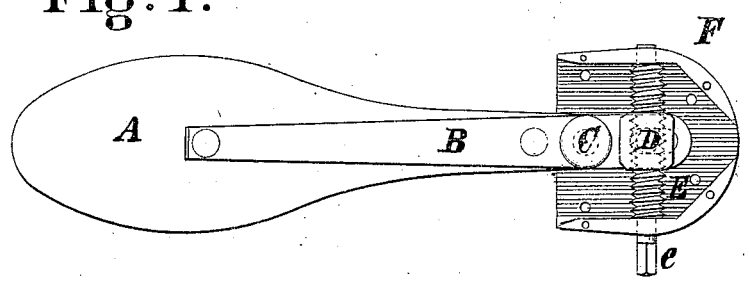
Figure 2:
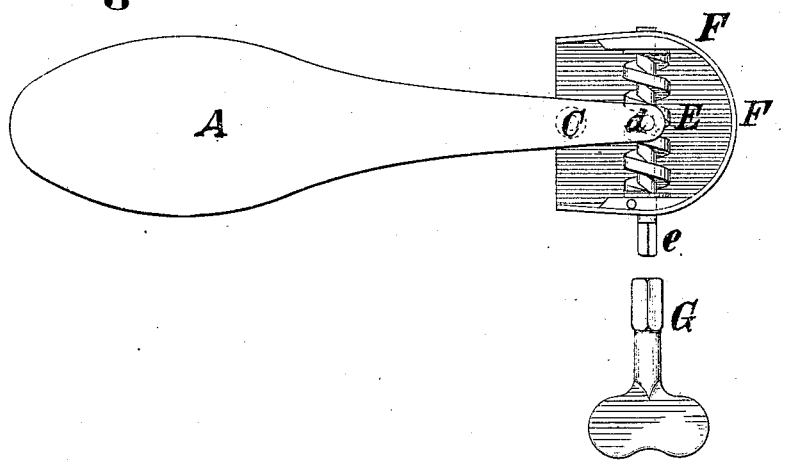

Figure 1 is a plan view, showing the sliding nut upon which the screw acts. Fig. 2 is a modification of the same, showing a pin engaging with the screw.

A is the sole, pivoted at C to the heel-plate. E is the endless screw, turned by the key G. B is a piece for strengthening the instep, which, of course, may be omitted if the instep be made strong enough without. The back part of the sole extends over (or under) the screw, and is slotted longitudinally, as shown in Fig. 1 in dotted lines. A nut D, capable of moving from side to side of the heel when the screw is turned, is fitted onto the screw, and is attached to the sole-piece by a pin entering the slot in the latter. The slot is made just wide enough to receive the pin, and long enough to prevent jamming, which would otherwise result, as the nut moves in a straight line, and the end of the sole-piece in a circular path around the pivot C.

Instead of this arrangement the pin may be fixed to the sole-piece, and the nut be dispensed with, as shown in Fig. 2, in which case the threads of the screw are made broader, so as to take a better hold.

What I claim as my invention is—

The combination, in a club-foot shoe, of slotted shank B, swiveled nut D, and screw E, as and for the purposes specified.

W. AUTENRIETH.

Attest:
   WM. S. BATES,
   JEREMIAH F. TWOHIG.